United States Patent [19]

Rush

[11] 4,134,362
[45] Jan. 16, 1979

[54] APPARATUS FOR MARKING TIRE SIDEWALLS

[75] Inventor: Kim E. Rush, Fullerton, Calif.

[73] Assignee: Kustom Fit Manufacturing Co., South Gate, Calif.

[21] Appl. No.: 869,573

[22] Filed: Jan. 16, 1977

[51] Int. Cl.² .............................................. B05C 1/02
[52] U.S. Cl. .................................. 118/211; 118/232
[58] Field of Search ................ 118/211, 218, 219, 232

[56] References Cited

U.S. PATENT DOCUMENTS

| | | | |
|---|---|---|---|
| 2,494,160 | 1/1950 | Bihary | 118/211 X |
| 2,754,798 | 7/1956 | Tilden | 118/219 X |
| 3,543,718 | 12/1970 | Keeler | 118/211 |

Primary Examiner—John McIntosh
Attorney, Agent, or Firm—Fulwider, Patton, Rieber, Lee & Utecht

[57] ABSTRACT

Apparatus for applying fluid coloring material to the sidewall of a vehicle tire and including a stand adapted for placement on a supporting surface adjacent the vehicle tire. A holder including an applicator is mounted to the stand. The holder is vertically adjustable and the applicator is outwardly movable to apply coloring material to the vehicle tire sidewall. The applicator is normally biased into engagement with the sidewall, but a holding element is operative to hold the applicator away from the sidewall in an inoperative position when desired. The stand includes a base having a foot shelf extending inwardly of the base periphery whereby an operator can steady the stand by applying foot pressure to the inner extremity of the foot shelf.

4 Claims, 3 Drawing Figures

U.S. Patent  Jan. 16, 1979  4,134,362
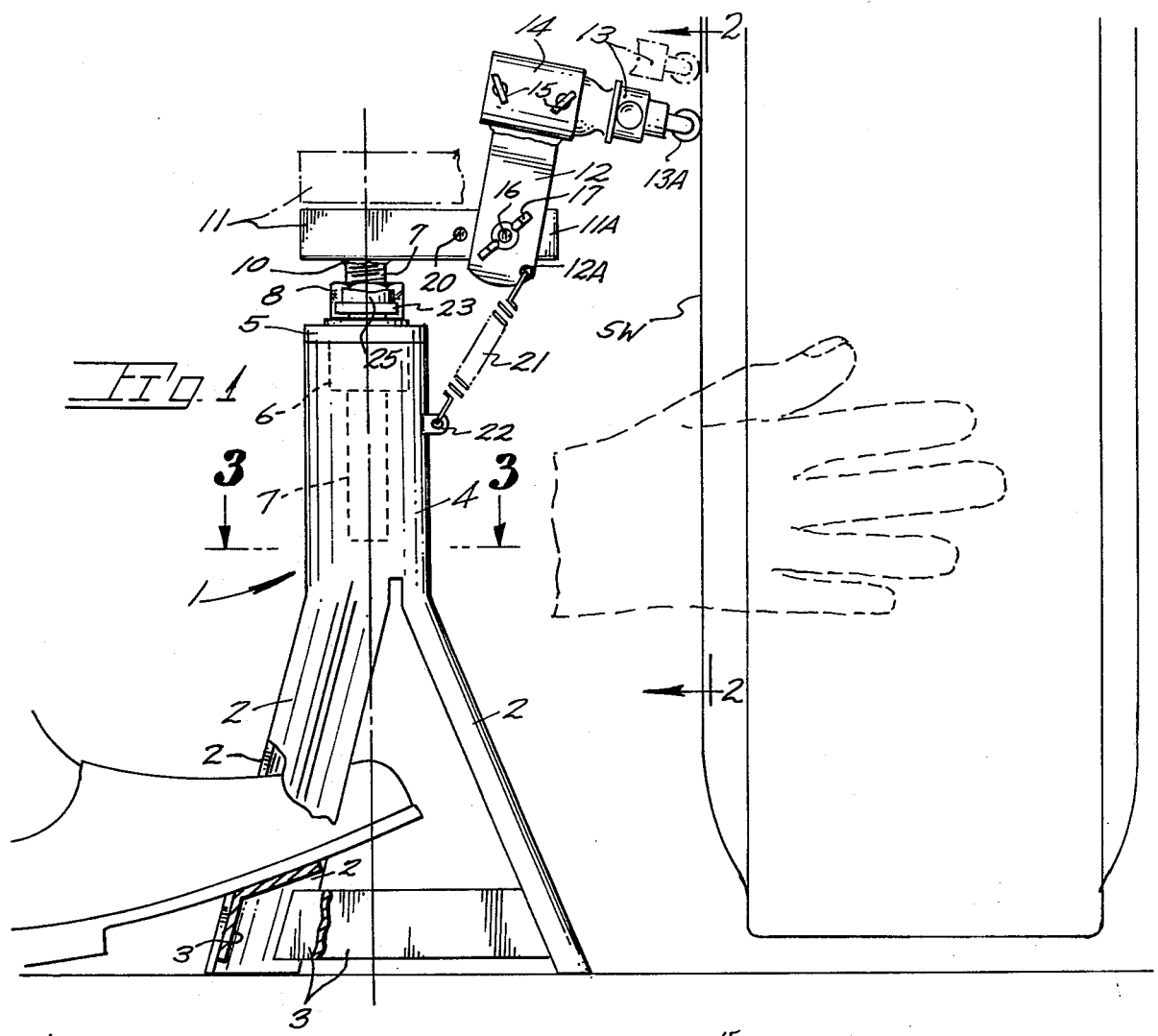
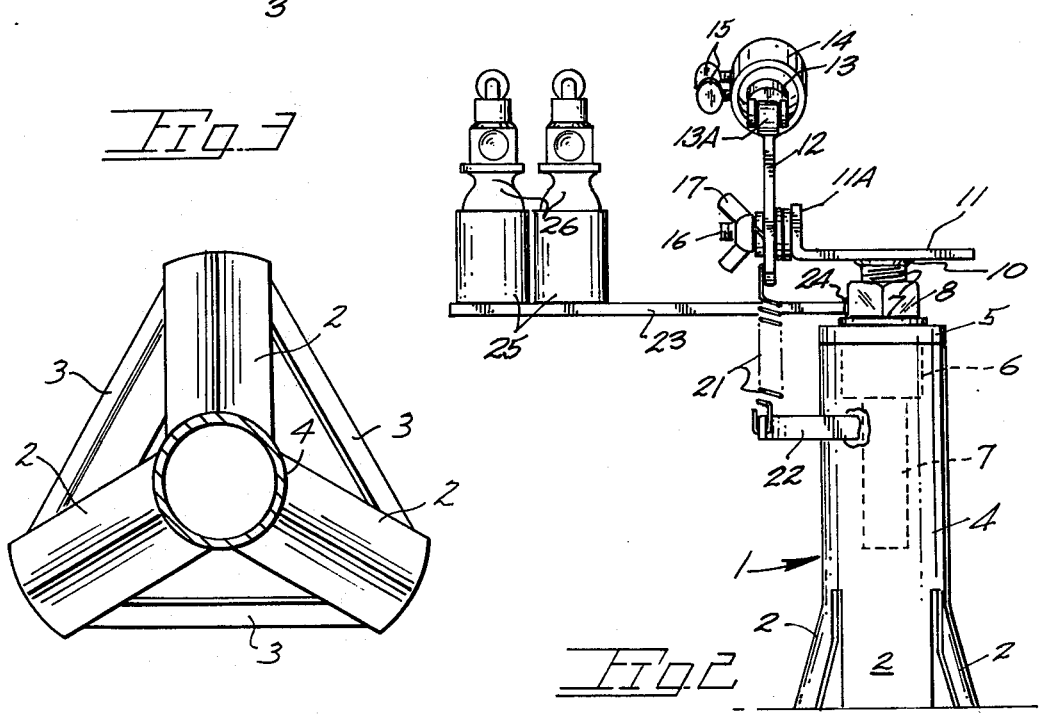

APPARATUS FOR MARKING TIRE SIDEWALLS

BACKGROUND OF THE INVENTION

1. Field of the Invention

The present invention relates generally to apparatus for applying fluid coloring material to the sidewall of a vehicle tire.

2. Description of the Prior Art

Various types of equipment are presently used for applying coloring material to tire sidewalls to give the appearance of sidewalls originally fabricated with shite sidewalls, for example. Such equipment is complex and requires considerable skill in its operation. It is not easily suited for use by individuals, smaller automobile dealerships, used car lots, service stations, or the like. It is particularly difficult to properly steady the equipment so that the tire marking is uniform and professional in appearance.

SUMMARY OF THE INVENTION

According to the present invention, an apparatus is provided for applying fluid coloring material to a tire sidewall which comprises a stand having a base placed upon a supporting surface and including a foot shelf which extends inwardly of the base periphery. By pressing upon the inner extremity of the foot shelf the operator can firmly steady the apparatus, leaving his hands free to perform the fluid material application.

The stand is vertically adjustable to locate a holder at the proper height for marking the particular size of tire involved. The holder includes an applicator movable toward and away from the tire sidewall, and a bias element is utilized for normally urging the applicator toward the sidewall. A holding element is provided to retain the applicator out of contact with the sidewall when desired.

The apparatus is relatively inexpensive, easily operated without appreciable training, and it can be steadied under most working conditions so that professional, attractive tire markings can be obtained. The operator's hands are left free so that he can manually rotate the tire and thereby avoid expensive wheel rotation equipment.

Other objects and features of the invention will become apparent from consideration of the following description taken in connection with the accompanying drawings.

BRIEF DESCRIPTION OF THE DRAWINGS

FIG. 1 is a side elevational view of the apparatus located adjacent an elevated vehicle tire;

FIG. 2 is a front elevational view of the apparatus taken along the line 2—2 of FIG. 1; and FIG. 3 is a view taken along the line 3—3 of FIG. 1.

Referring now to the drawings, the apparatus according to the present invention comprises, generally, a vertically elongated stand having a lower portion or base terminating in three legs 2. The lower extremities of the legs 2 constitute bearing portions which engage the floor, ground or other supporting surface and provide a stable support during the tire marking operation.

The legs 2 diverge in a downward direction and their lower extremities or bearing portions are thus perimetrically arranged, as best seen in FIG. 3. The legs 2 are convected together by cross members 3, at least one of which includes a radially inwardly directed portion, as seen in FIG. 1. This portion is an integral, inwardly deformed continuation of the cross member 3 and constitutes a foot shelf. By inserting his foot in the opening defined by the adjacent pair of spaced apart legs 2 above the cross member 3, the operator can press upon the foot shelf, and particularly the inner terminus thereof. Since the inner terminus is located radially inwardly of the supporting surface generally bounded by the perimetrically arranged lower extremities or bearing portions of the legs 2, the foot pressure results in urging all such bearing portions into firm engagement with the supporting surface, and particularly the bearing portion opposite the illustrated foot shelf, which bearing portion is that one which is located adjacent the vehicle tire SW. This arrangement allows the operator to steady the apparatus with one foot, leaving his hands free to rotate the tire and manipulate the coloring material applicator, as will be seen.

The steadying effect of foot pressure on the inner terminus of the foot shelf portion of the cross member 3 located remote from the vehicle tire SW is enhanced if the stand 1 is made with three legs.

The stand 1 includes a hollow, cylindrical upper portion 4 closed at its upper end by an end plate 5. Depending from end plate 5 is an internally threaded boss 6 which adjustably receives a threaded shaft 7. The shaft 7 is threadable upwardly and downwardly, and a nut 8 is operative to lock shaft 7 in desired position relative to the stand upper portion 4.

A right angular bracket 11 is secured by a weld 10 to the upper end of shaft 7. A holder 12 includes a holder lower portion which is mounted by a threaded stud 16 and wing nut and lock washer assembly 17 to the right angular portion or upright flange 11A of bracket 11. By easing the wing nut 17 the holder 12 can be pivoted toward and away from the tire SW. Tightening the wing nut 17 holds the holder 12 in whatever pivoted position is selected.

The degree of movement of the holder 12 away from the tire SW is limited by engagement of the holder 12 with a limit stop 20 secured to the flange 11A, as seen in FIG. 1.

The cylindrical body of an applicator 13 adapted to contain fluid coloring material for marking the tire SW is carried within a cylindrical collar portion 14 welded to the upper extremity of the holder lower portion. Threaded thumb screws 15 mounted to the collar portion 14 are operative to bear against and hold applicator 13 in position.

A tension spring 21 is attached at one end within an opening 12A in the holder 12, and is attached at its opposite end to a bracket 22 which is secured to the stand upper portion 4. Loosening of the wing nut 17 allows the spring 21 to urge the holder 12 and applicator 13 toward the tire SW. An applicator wheel 13A of the applicator 13 is thereby resiliently urged against tire sidewall, applying fluid coloring material from the applicator.

The limit stop 20 is operative to support the holder 12 in an outwardly pivoted position, in which position the fluid coloring material cannot seep from the gravity fed applicator 13 when it is not being used to mark the tire SW. The applicator 13 is well known in the art and forms no part of the present invention.

Applicator wheel 13A is preferably located to rotate against the tire sidewall at a point which is located in a horizontal plane passing through the axis about which the vehicle wheel rotates. Consequently, it may be necessary to adjust bracket 11 upwardly, as indicated in phantom outline in FIG. 1, which is accomplished by rotation of the bracket 11 and shaft 7 within the supporting boss 6 of the stand 1.

An arm 23 is secured to locking member 8 by a weld 24 and supports marking liquid storage receptacles 25 for receiving spare applicators 26.

In use of the present apparatus, the operator, who is normally seated upon a stool adjacent the tire, applies foot pressure to the foot shelf of the cross member 2 to steady the apparatus. The wing nut assembly 17 is loosened to permit the bias of spring 21 to swing the holder 12 and applicator 26 to the operative position illustrated in FIG. 1. The applicator wheel 13A now rests against the tire sidewall SW, and the operator then rotates the vehicle wheel to spread coloring material from the applicator onto the tire SW. The width of the applied band of coloring material can be broadened by merely shifting the location of the stand 1 to provide a new course for the wheel 13A adjacent the already applied band of material.

When the tire marking is completed, the holder 12 is pivoted away from the tire SW so that it rests against the limit stop 20, and the wing nut assembly 17 is tightened to maintain the holder in this retracted position.

Various modifications and changes may be made with regard to the foregoing detailed description without departing from the spirit of the invention.

I claim:

1. Apparatus for applying fluid coloring material to the sidewall of a vehicle tire, said apparatus comprising:

a stand including a base having perimetrically arranged bearing portions adapted to engage a supporting surface, said base including a foot shelf extending inwardly of the perimeter of said bearing portions, said base further including an opening above said foot shelf adapted to allow an operator's foot to be placed upon said foot shelf whereby the operator may bias the inner extremity of said foot shelf downwardly to effect firm engagement between said bearing portions and the supporting surface;

a holder mounted to said stand, and including an applicator adapted to contain fluid coloring material and further adapted for movement outwardly of said holder for engagement with the sidewall of a vehicle tire; and bias means normally urging said applicator outwardly of said holder.

2. Apparatus according to claim 1 and including means mounting said holder to said stand and operative to adjust the vertical position of said holder relative to said stand.

3. Apparatus according to claim 1 wherein said bearing portions are defined by the lower extremities of three legs forming a part of said base.

4. Apparatus according to claim 1 and including holding means operative to constrain movement of said applicator relative to said holder.

* * * * *